3,423,642
ELECTROLYTIC CELLS WITH AT LEAST THREE ELECTRODES
Edward J. Plehal, Woodland Hills, Gene Frick, Pacific Palisades, and Martin Mintz, Woodland Hills, Calif., assignors to The Bissett-Berman Corporation, Santa Monica, Calif., a corporation of California
Filed Oct. 18, 1966, Ser. No. 587,590
U.S. Cl. 317—231                    20 Claims
Int. Cl. H01g 9/04

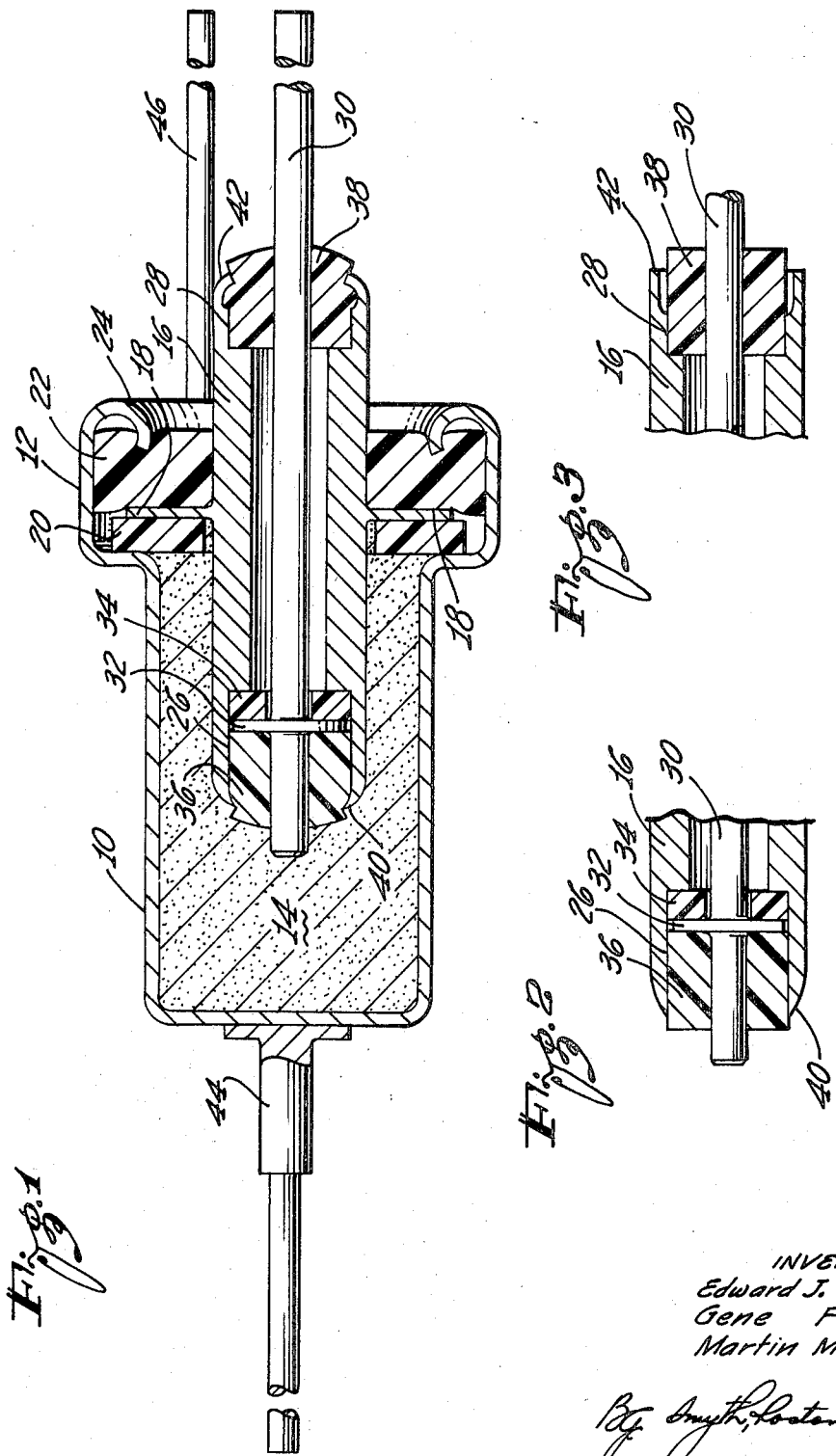

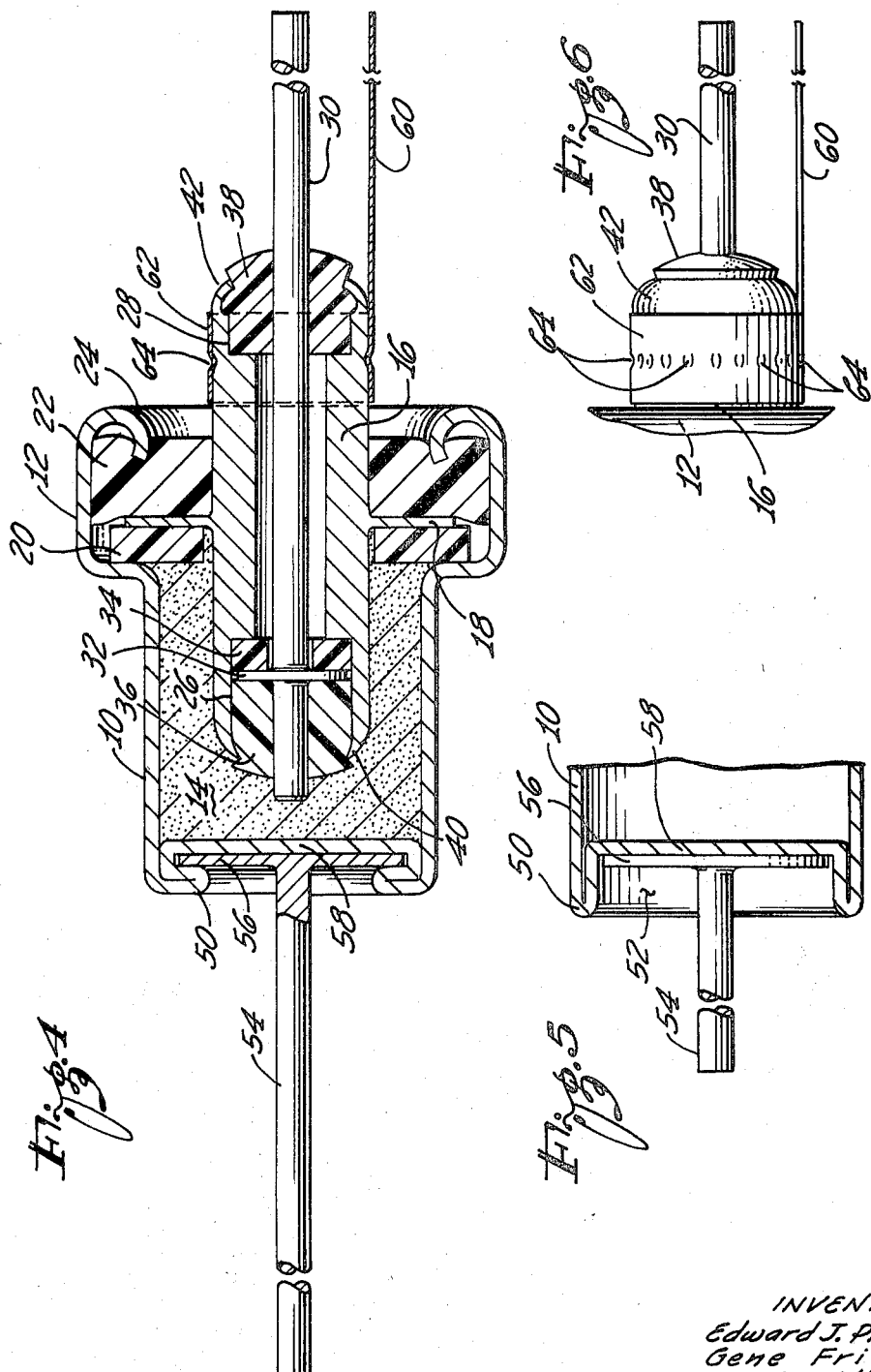

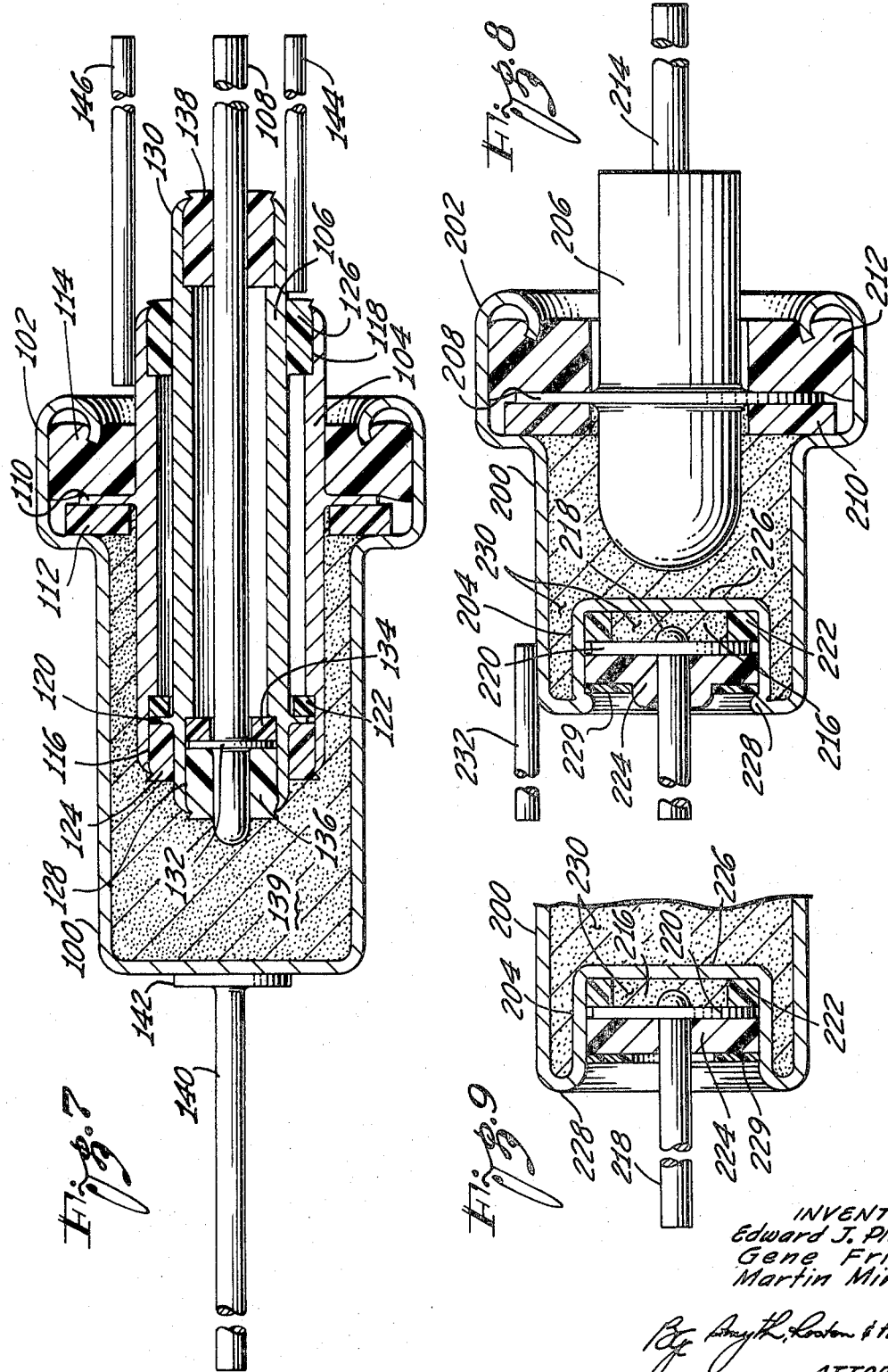

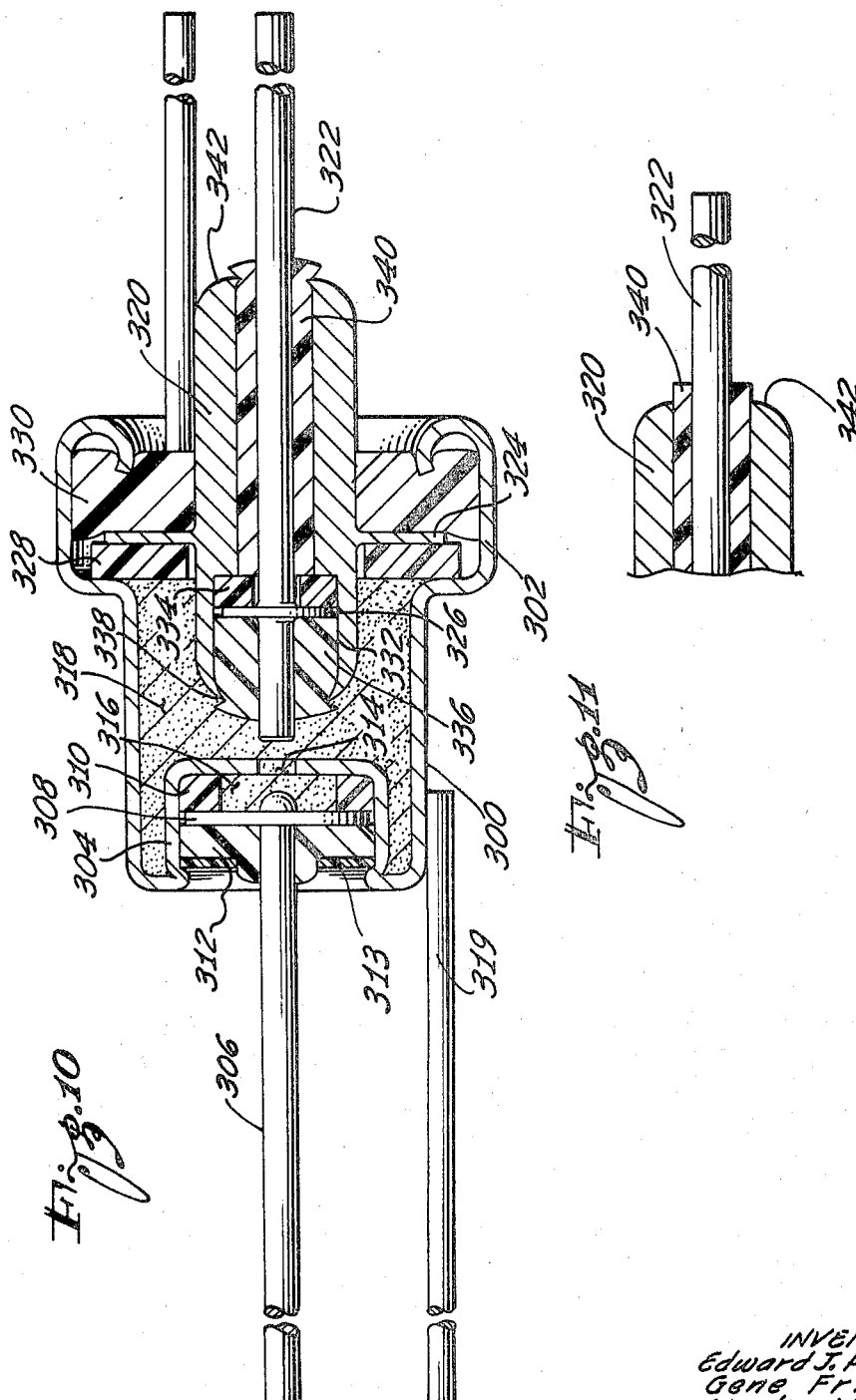

ABSTRACT OF THE DISCLOSURE

An electrolytic cell comprises a container with an electrolyte and a plurality of electrodes sealed within it. At least one electrode has a metal surface electrochemically active with the electrolyte, and the electrolyte contains a mobile ionic component of the metal that forms the electrode surface. Other electrodes have surfaces comprising masking layers chemically nonreactive with the electrolyte. The mobile component in the electrolyte is platable on and deplatable one or more of the other electrodes as desired.

---

This invention relates to electrolytic cells. The electrolytic cells of the present invention are characterized by a pair of electrodes which are in contact with an electrolyte. The electrodes of the electrolytic cell are used to transfer an active material between the electrodes. The active material is transferred through the electrolyte by the passage of electrical current between the electrodes. For example, one electrode may be coated with an active material such as silver and the other electrode may be coated with a plating surface such as an inert material, such as gold. When electrical current is applied through the electrolytic cell in the proper direction, the silver from the one electrode is electroplated on the gold surface of the other electrode.

The present invention relates to improvements in electrolytic cells of the type as described above. Specifically, one aspect of the present invention relates to particular structures for electrolytic cells which include more than the minimum number of only two electrodes. These electrolytic cells, therefore, may be generally characterized as multiple-electrode electrolytic cells. The present invention is also directed to new constructions for electrolytic cells which eliminate costly assembly procedures which are found in prior art electrolytic cells. For example, prior art electrolytic cells require soldering or welding operations so as to attach electrical leads to the electrodes. The present invention provides for a mechanical attachment of electrical leads such as by the attachment of electrical leads through a crimping operation. The mechanical attachment of the electrical leads of the present invention is simpler and more reliable than prior art methods of attachment.

The electrolytic cells of the prior art and of the present invention are used for various timing and integration functions. For example, copending application Ser. No. 179,847, filed Mar. 15, 1962, in the name of Thomas B. Bissett and assigned to the assignee of the instant application, relates to various uses for electrolytic cells. As indicated above, the electrolytic cells include at least a pair of electrodes, both of which are in contact with an electrolyte so as to transfer the active material between the electrodes with the passage of current through the electrolytic cell. It is often desirable to use electrolytic cells for more than one timing or integration function. For example, it may be desirable to provide for two timing functions with a single electrolytic cell and it would, therefore, be necessary to provide the single electrolytic cell with a multiple electrode structure. As indicated above, one aspect of the present invention is the construction of electrolytic cells having such multiple electrode structures.

One difficulty with prior art electrolytic cells is that they were relatively expensive to manufacture especially if the electrolytic cells were of a small size. The present invention is also directed to techniques to reduce the cost of the electrolytic cells while maintaining a small size for the electrolytic cells.

One particular structure for an electrolytic cell which has been proposed in prior applications filed on behalf of applicants' assignee includes an outer housing member shaped like a can having a closed end and an open end and wherein the outer housing member serves as an electrode. The outer housing member may be constructed completely of an active material such as silver or may be constructed of a base metal plated with the active material such as silver. An inner electrode is disposed within the outer housing member and the inner electrode extends into the outer electrode through the open end. The open end of the outer housing member is physically deformed against an insulator structure so as to provide a seal for the electrolytic cell. The electrolyte is, of course, sealed within the outer electrode so that it is in contact with both the inner and outer electrodes.

A clearer understanding of the above described prior art type of electrolytic cell is shown in copending application Ser. No. 519,634 filed Jan. 10, 1966, in the name of Martin Mintz and assigned to the assignee of the instant application. As can be seen in the copending Mintz application, the electrolytic cell may include an enlarged portion of the outer electrode. The inner electrode has a flange member to fit within the enlarged portion of the outer electrode and a pair of insulating members sandwich the flange member of the inner electrode within the enlarged portion of the outer electrode. The end of the outer electrode is then crimped over to grip one of the insulating members so as to seal the electrolytic cell.

The electrolytic cell shown in the copending Mintz application wherein the outer housing also serves as an electrode is relatively inexpensive to manufacture and is relatively small since the outer housing provides for two functions. One aspect of the present invention is directed to improvements in the electrolytic cell of the type described in the copending Mintz application wherein all electrical leads which are attached to the electrolytic cell are mechanically attached by physical deformations to eliminate all soldering and welding steps. This is a distinct advantage since soldering and welding operations are costly and difficult to produce and the mechanical assembly is much simpler and more reliable.

The present invention is also directed to improvements in electrolytic cells of the type shown in the Mintz copending application wherein multiple-electrode structures are included within the electrolytic cell. Generally, the present invention is directed to the use of multiple inner electrodes which are concentric with the outer electrode structure. The multiple inner electrodes may extend from opposite ends of the outer electrode member or may extend from the same end of the outer electrode member.

One embodiment of the present invention, for example, includes a concentric multiple inner electrode structure which extends from the open end of the outer electrode and is concentric within the outer electrode. Another embodiment of the present invention includes an inner electrode which extends within a recess in the closed end of the outer electrode structure. The recess may be produced by folding in the closed end of the outer electrode. The recess may be completely separate from the main internal chamber of the outer electrode or the recess may include an opening so as to provide for communication between the recess and the main internal chamber of the outer electrode.

The use of a folded-in structure so as to provide a recess for an inner electrode may be also used so as to provide an attachment point for an electrical lead. For example, a smaller recess may be formed in the closed end of the outer electrode and a flange portion of an electrical lead disposed within the recess. The outer ends of the recess may then be folded in so as to support the flange portion within the recess and so as to provide for a mechanical maintenance of the electrical lead in good physical contact with the outer electrode.

The present invention is, therefore, directed to improvements in electrolytic cells and specifically is directed to improvements in electrolytic cells of the type wherein one electrode serves as an outer housing. The improvements of the present invention are directed to the use of multiple inner electrodes for the electrolytic cell so as to provide for more than one timing function from the electrolytic cell and to new structures for attaching electrical leads to the electrolytic cell so as to eliminate the costly soldering or welding operations.

A clearer understanding of the invention will be had with reference to the drawings, wherein:

FIGURE 1 is a cross section of a first embodiment of the invention using a concentric multiple inner electrode structure;

FIGURE 2 is a fragmentary view of the inner portion of the inner electrode of FIGURE 1 prior to physical deformation;

FIGURE 3 is a fragmentary view of the outer portion of the inner electrode of FIGURE 1 prior to physical deformation;

FIGURE 4 is a cross section of a second embodiment of the invention illustrating the attachment of electrical leads using mechanical deformation;

FIGURE 5 is a fragmentary view of a portion of the embodiment of FIGURE 4 showing the closed end of the outer electrode prior to physical deformation;

FIGURE 6 is a fragmentary view of a portion of the embodiment of FIGURE 4 showing the attachment of the electrical lead to the inner electrode;

FIGURE 7 is a cross-section of a third embodiment of the invention showing a triple concentric inner electrode;

FIGURE 8 is a cross-section of a fourth embodiment of the invention having inner electrodes extending from both ends of the outer electrode;

FIGURE 9 is a fragmentary view of a portion of the embodiment of FIGURE 8 showing the recessed portion in the closed end of the outer electrode prior to physical deformation;

FIGURE 10 is a cross-section of a fifth embodiment of the present invention having a first inner electrode extending into a recess formed in the closed end of the outer electrode and a dual inner electrode structure extending into the open end of the outer electrode; and FIGURE 11 is a fragmentary view of the dual inner electrode of FIGURE 10 illustrating the outer portion of the dual electrode prior to physical deformation.

In FIGURE 1, a first embodiment of an electrolytic cell in accordance with the invention is shown and the first embodiment includes an outer housing 10 which serves as an outer electrode. The outer housing has a major axis. The outer electrode 10 has an open and a closed end and may be constructed of an active material such as silver, or may be constructed of a base material which includes a coating of the active material. The outer electrode includes an enlarged section 12 at the open end. An electrolyte 14 is contained within the outer electrode 10. The electrolyte may have an appropriate chemical composition and as an example, when the active material is silver, the electrolyte may be composed of silver phosphate in a solution of phosphoric acid as disclosed in copending application Ser. No. 554,003 filed May 31, 1966, in the name of Edmund A. Miller and assigned to the same assignee as the instant application. As will be seen, the electrolyte contains a mobile ionic component of the active metal such as silver.

The inner electrode structure of the embodiment of FIGURE 1 is composed of a pair of concentric electrodes which are disposed substantially on the major axis of the outer electrode. The concentric electrodes include a first inner electrode 16 which has an outer flange member 18. The flange 18 fits within the enlarged portion 12 of the outer electrode 10. A pair of insulating members 20 and 22 sandwich the flange within the enlarged portion. Both insulating members are composed of inert plastic material so as not to be contaminated by the electrolyte 14. The insulating member 20 is usually composed of plastic material which is relatively hard since the insulating member 20 must provide support for the flange 18 within the enlarged portion 12. For example, the insulating member 20 may be composed of polytetrafluoroethylene which is sold under the trade name "Teflon" by the Du Pont Company.

The second insulating member 22 is composed of plastic material which is relatively soft since the insulating member 22 is used to provide a seal at the open end of the outer electrode 12. For example, the insulating member 22 may be composed of a material such as polychlorotrifluoroethylene sold under the trade name "KEL-F" by Minnesota Mining and Manufacturing Co. The outer edge of the enlarged portion 12 is crimped over as shown at position 24 to grip the insulating member 22 so as to provide for a tight seal at the open end of the electrolytic cell. The electrolytic cell structure described above with reference to FIGURE 1 is similar to the electrolytic cell shown in the Mintz and Miller copending applications. The electrolytic cell of the present invention, however, provides for an additional inner electrode concentric with the first inner electrode 16.

The first inner electrode 16 is tubular and includes enlarged inner portions 26 and 28. A second inner electrode 30 is designed to fit concentrically within the first inner electrode 16. The second inner electrode 30 includes a flange portion 32 to fit within the enlarged inner portion 26. A pair of insulating members 34 and 36 sandwich the flange portion 32 within the enlarged portion 26. A third insulating member 38 fits over the second inner electrode 30 and the insulating member 38 fits within the enlarged inner portion 28 of the first inner electrode 16.

A tip portion 40 of the first inner electrode 16 is physically deformed or crimped so as to grip the insulating member 36 and seal the second inner electrode 30 within the first inner electrode 16. An end portion 42 of the first inner electrode 16 may be crimped inward so as to grip the insulating member 38 thereby mechanically securing the second inner electrode 30 within the first inner electrode 16. As can be seen in FIGURE 1 the seal at the inner portion of the dual inner electrode structure is formed by the insulating members 36 and 34 and the flange 32 and the seal is similar to the seal at the end of the outer electrode which is formed by the insulating members 20 and 22 and the flange 18. The insulating members 34 and 36 may be composed of materials which are similar to the insulating members 20 and 22. For example, insulating member 34 may be composed of Teflon and insulating members 36 and 38 may be composed of KEL-F.

FIGURES 2 and 3 show fragmentary views of the inner and outer portions of the dual inner electrode structure of FIGURE 1 prior to the physical deformation of the end portions. In FIGURE 2 it can be seen that the tip portion 40 is initially straight so that the sandwich construction including the pair of insulating members 34 and 36 surrounding the flange 32 may be slid into the enlarged inner structure 26. At the other end of the dual inner electrode structure, as shown in FIGURE 3, the insulating member 38 is slid over the second inner electrode 30 and into the enlarged portion 28. The dual electrode structure is then sealed by crimping over the tip portions 40 and 42 so as to physically secure the second inner electrode 30 within the first inner electrode 16. The inner electrodes 16 and 30 are also insulated from each other due to the use of insulating members 34, 36 and 38.

The inner electrodes of the present invention usually include a masking layer of inert material which serves as a plating surface for the active material. This inert material is electrochemically non-reactive with the electrolyte. The active material may be plated onto the layer of inert material of the inner electrodes during a first particular type of operation of the electrolytic cell. Specifically, the mobile ionic components of the active metal such as silver are selectively electroplatable on and deplatable from the masking layers on the inner electrodes. As a second particular type of operation of the electrolytic cell, the active material may be pre-plated on the inner electrodes and the electrolytic cell is operated by deplating the active material from the inner electrodes to the outer electrode. The pre-plating of the active material, therefore, operates as a predetermined timing function which is built into the electrolytic cell prior to the use of the electrolytic cell.

One particular material which may be used for the inert layer of material to receive the active material is gold. Since gold is relatively expensive, the electrodes are usually constructed of a base material such as steel, which is then plated with the gold. For example, the plating may be in accordance with the plating process described in co-pending application Ser. No. 576,601 filed on Sept. 1, 1966, in the names of Martin Mintz and Leon P. Brown and assigned to the same assignee as the instant case. Because of the particular structure of the present invention the plating operation may actually be accomplished in two steps. For example the inner electrodes 16 and 30 may be initially plated prior to assembly so that the inner electrodes both have a coating of inert material. The dual inner electrode structure is then assembled using the various insulating members described above and the tip portions 40 and 42 crimped into position. The dual inner electrode structure may then be subject to a final plating operation to deposit the proper amount of inert material such as gold. The dual plating operation is preferable to a single plating operation since it insures that all areas of the electrode structure are coated with inert material which eliminates corrosion which might occur due to a slight mechanical failure within the inner electrode structure.

The embodiment of FIGURE 1 also includes a pair of lead members 44 and 46 which are attached to the outer electrode 12 and the first inner electrode 16. The usual method of attaching the lead members 44 and 46 is by soldering or welding. The inner electrode 30 may also have a lead member welded to provide an extension or the inner electrode 30 may be made sufficiently long so as to act as its own electrical lead. The attachment of electrical leads by such as soldering or welding are relatively expensive and the attachment is difficult to perform with great reliability. It would therefore be desirable to attach the electrical leads such as the electrical leads 44 and 46 with a mechanical method of attachment which may be automated for greater reliability and lower cost.

FIGURE 4 illustrates a second embodiment of the invention generally similar to the embodiment of FIGURE 1 but including electrical leads which are connected by a mechanical method of attachment. Similar elements in FIGURE 4 are given the same reference character from FIGURE 1. In the embodiment of FIGURE 4, the outer electrode 10 includes the enlarged portion 12 and the dual inner electrode structure including inner electrodes 16 and 30 is sealed at the open end of the outer electrode 10. The dual inner electrode is sealed through the use of the insulating members 20 and 22 sandwiching the flange 18 within the enclosed portion 12. The inner electrode 30 is sealed within the inner electrode 16 by the use of the insulating members 34, 36 and 38.

The outer electrode 10 is folded in at its closed end to form a recess. This may be more clearly shown in FIGURE 5 where the folded end of the outer electrode 10 is designated by reference character 50. The recess which is formed at the closed end 50 is designated by reference character 52. As can be seen in FIGURES 4 and 5, an outer lead 54 includes a flange member 56 and the flange member is disposed within the recess 52 and up against an end wall 58 of the recess 52. FIGURE 5 shows the electrical lead 54 in position within the recess 52 prior to the physical deformation of the end portion 50 of the outer electrode 10. FIGURE 4 illustrates the end portion 50 physically deformed or crimped so as to securely maintain the flange 56 up against the end wall 58. As can be seen in FIGURES 4 and 5, the electrical lead 54 is securely mechanically attached to the outer electrode 10 to thereby provide a good electrical connection between the electrical lead 54 and the outer electrode 10.

The embodiment of FIGURE 4 also includes an electrical lead 60 for attachment to the inner electrode 16 which does not require any soldering or welding. The electrical lead 60 includes a circular band portion 62. The band portion 62 circumferentially surrounds the inner electrode 16 and the band portion 62 is maintained in position by a series of crimps 64 which physically deform the band portion and the inner electrode 60 as shown in FIGURE 4. FIGURE 6 illustrates the band portion 62 surrounding the inner electrode 16 and in FIGURE 6 the crimps 64 can be seen to extend completely around the circumference of the band 62. The electrical lead assembly shown in FIGURE 6 may be mechanically attached to the inner electrode assembly at a time prior to the final plating of the inner electrode assembly. Therefore, when the inner electrode assembly is finally plated, the lead member 60 is not only mechanically attached by the crimps 64 along the band 62 but the plating itself provides for an attachment of the lead 60 to the inner electrode 16.

FIGURE 7 illustrates a third embodiment of the invention which includes a triple concentric inner electrode. The embodiment of FIGURE 7 is similar to the embodiment of FIGURES 1 and 4 in that all the inner electrodes are concentric to each other. In FIGURE 7 an outer electrode 100 has an enlarged section 102. The series of three inner electrodes are concentric with each other and include a first inner electrode 104, a second inner electrode 106 and a third inner electrode 108. The electrode 104 includes a flange portion 110 to fit within the enlarged section 102 of the outer electrode 100. The flange portion 110 is sandwiched by two insulating members 112 and 114 which may be similar to the insulating members 20 and 22 of FIGURE 1. The open end of the outer electrode 100 is crimped over so as to seal the electrolytic cell.

The inner electrode 104 includes a pair of enlarged inner portions 116 and 118 at each end. The inner electrode 106 includes a flange member 120 to fit within the enlarged portion 116. The flange portion 120 is flanked by a pair of insulating members 122 and 124 which are similar to the insulating members 32 and 36 of FIGURE 1. A tip portion of the insulating member 104 is crimped into the insulating member 124 so as to provide a seal. An insulating member 126 is disposed within the enlarged portion 118, and the other end of the inner electrode 104 is crimped in to provide a seal between the inner electrode 104 and the inner electrode 106.

Finally, the inner electrode 106 includes a pair of enlarged inner portions 128 and 130. The inside inner electrode 108 includes a flange portion 132 to fit within the enlarged inner portion 128. A pair of insulating members 134 and 136 similar to the insulating members 34 and 36 of FIGURE 1 sandwich the flange portion 132 within the enlarged portion 128. A tip portion of the inner electrode 106 is crimped to provide a seal between the inner electrode 106 and the inner electrode 108 within the outer electrode 100. An insulating member 138 is disposed in the enlarged portion 130 and the end of the inner electrode 106 is crimped into the insulating member 138 so as to provide a seal between the electrodes 106 and 108 outside the outer electrode 100. The outer electrode contains an electrolyte 138.

As can be seen in FIGURE 7, all of the insulating members and flange portions are similar to those shown in FIGURE 1, but the embodiment of FIGURE 7 has a triple concentric inner electrode. A lead member 140 is attached to the outer electrode 100 by soldering of a flange portion 142 to the outer electrode 100. It is to be appreciated that the lead member 140 may be attached in a manner similar to that shown in FIGURE 4 by folding in the closed end of the outer electrode 100 to form a recess. In addition, lead members 144 and 146 are attached to the inner electrodes 106 and 104 by some appropriate means such as soldering or welding. Again, it is to be appreciated that these lead members may be attached by a physical deformation using a lead structure as shown in FIGURES 4 and 6.

FIGURE 8 shows a fourth embodiment of the invention wherein a pair of inner electrodes are concentric with an outer electrode and the inner electrodes extend into the outer electrode from opposite sides. Specifically the embodiment of FIGURE 8 may use an electrolytic cell as shown in the copending Mintz application Ser. No. 519,634 and wherein the electrolytic cell has the closed end of the outer electrode folded in to receive a second inner electrode. As shown in FIGURE 8, an outer electrode 200 has an enlarged section 202 at the open end of the outer electrode and a folded-in section 204 at the closed end of the outer electrode. A first inner electrode 206 including a flange portion 208 is inserted into the outer electrode 200 at the open end.

A pair of insulating members 210 and 212 sandwich the flange portion 208 within the enlarged section 202 and the insulating members may be of the same type used in FIGURE 1. For example, insulating member 210 may be composed of Teflon and insulating member 212 may be composed of KEL-F. The open end of the outer electrode 200 is crimped in so as to grip the insulating member 212 and so as to provide a seal between the inner electrode 206 and the outer electrode 200. It is to be appreciated that the inner electrode may be plated with an inert material such as gold, as may all of the inner electrodes described in this application. Also a lead member 214 may be attached to the inner electrode 206.

The closed end of the outer electrode 200 has the folded-in section 204 as described above. The folded-in portion 204 encloses a recess 216 which is designed to receive an electrode. An electrode 218, which has an integral flange portion 220, extends into the recess 216. A pair of insulating members 222 and 224 sandwich the flange portion 220 within the recess and against an inner wall portion 226. An insulating member 229, composed of hard material is positioned adjacent to the insulating member 224. The recess and the main chamber portion of the outer electrode are both filled with an electrolyte 230.

A seal is produced between the inner electrode 218 and the outer electrode 200 by physically deforming end portions 228 so as to grip the insulating member 229. FIGURE 9 shows the end portions 228 before they are physically deformed and it can be seen that flange portion 220 of the inner electrode 218 is merely inserted into the recess 216 after the insulating member 222 has been placed in the recess 216 and the insulating members 224 and 229 are then slid over the electrode 218. The final seal is accomplished by physically deforming the end portions 228. It is to be appreciated that the inner electrode 218 just as all of the other inner electrodes disclosed in this application may be plated with gold or other inert material in a manner provided for in the Mintz and Brown copending application Ser. No. 576,601.

It may also be seen that the embodiment of FIGURE 8 may be easily adapted from the electrolytic cell disclosed in the Mintz copending application Ser. No. 519,634 so as to produce a dual electrode electrolytic cell. A lead member 232 may be attached to the outer electrode 200 to complete the dual electrolytic cell.

FIGURE 10 shows a fifth embodiment of the invention which is a modification of the embodiment of FIGURE 9 but additionally including a modified dual inner electrode similar to that shown in FIGURES 1 and 4. In FIGURE 10 an outer electrode 300 includes an enlarged section 302 and a folded-in portion 304. The folded-in portion contains a first inner electrode 306 which has an integral flange portion 308 sandwiched between a pair of insulating members 310 and 312 and including an additional hard material insulating member 313. The electrode 306 and surrounding structure is essentially similar to that shown in FIGURE 9 except an opening 314 communicates between a recess 316 and a main chamber 318 within the outer electrode 300. The opening 314 may be used so as to insert the electrolyte within the electrolytic cell in one operation or the opening 314 may be used to help eliminate bubbles which may be trapped within the electrolytic cell. A lead member 319 may be attached to the outer electrode 300.

The electrolytic cell of FIGURE 10 also includes a dual inner electrode disposed within the open end of the outer electrode 300. The dual inner electrode includes a first inner electrode 320 and a second inner electrode 322. The first inner electrode includes an integral flange portion 324 and the second inner electrode includes an integral flange portion 326. The flange portion 324 is sandwiched within the enlarged section 302 of the outer electrode 300 by a pair of insulating members 328 and 330. The first inner electrode 320 is maintained in sealed engagement by the crimp provided at the open end of the outer electrode 300 and this structure is essentially similar to that shown in FIGURES 1, 4, 7 and 8.

The inner electrode 320 also includes an enlarged inner portion 332. The inner electrode 322 includes the integral flange 326 within the enlarged inner portion 332 and the flange 326 is sandwiched by a pair of insulating members 334 and 336. The insulating members 334 and 336 provide for a seal between the inner electrodes 320 and 322 by a physical deformation of a tip portion 338 so as to grip the insulating member 336. As discussed above, the insulating members may be of the type discussed with reference to FIGURES 1, 4, 7 and 8 and specifically insulating member 334 may be composed of Teflon and insulating member 336 may be composed of KEL-F. The remaining open area between electrodes 320 and 322 is filled by an insulating sleeve member 340. The sleeve member 340 provides for complete insulation between the electrodes 320 and 322 and eliminates any possibility of shorting between the electrodes. The outer tip portion 342 may be crimped inward so as to provide for a mechanical gripping of the insulating sleeve 340. FIGURE 11 illustrates the embodiment of FIGURE 10 wherein the tip portion 342 has not been physically deformed.

As can be seen by the above disclosure, the present invention is directed to improvements in electrolytic cells. Specifically, the present invention provides for inner electrode structures which are multiple electrodes so that the electrolytic cell of the present invention may provide more than a single timing or integration function. In addition, the electrolytic cells of the present invention include the mechanical attachment of eelctrical leads as to eliminate all soldering or welding operations.

The present invention has been illustrated by many embodiments showing various alternative structures. Generally, the various seals between electrodes is accomplished using a sandwich structure incorporating a metal flange and a pair of insulating members. It is also to be noted that in all of the examples given, the outer electrode or housing is usually constructed of an active material, for example, silver, and the inner electrodes all include a layer of inert material, for example, gold. In addition an electrolyte is always present between the electrodes. Also, the inner electrodes of the present invention may be plated with predetermined amounts of active material and this active material may be then transferred to the outer electrode so as to provide for a predetermined timing operattion.

The physical construction of the present invention includes a concentric relationship nature between the inner electrodes and the outer electrode. In addition some embodiments of the present invention include a concentric relationship between multiple inner electrodes. Also, the physical constructions of the present invention may encompass the folding-in of the outer conductor to form a recess to either receive an electrical lead or an inner electrode. The present invention also provides structures for mechanically attaching electrical leads without soldering or welding.

It should be noted that the embodiments shown in FIGURES 9 and 10 do not disclose electrical leads for the outer electrode, but it is to be appreciated that such electrical leads may be attached by crimping, soldering or welding as illustrated by other embodiments of the invention. The present invention has been illustrated with relation to particular embodiments and specific structures but it is to be appreciated that various adaptations and modifications may be made. The invention is, therefore, only to be limited by the appended claims.

What is claimed is:
1. An electrolytic cell in combination, comprising
an open container-electrode having a metal inner surface and a major axis,
an electrolyte containing a mobile ionic component of and contacting said metal surface,
a first electrode within said container-electrode, disposed substantially on the major axis and spaced from said inner surface and having an electrically conductive masking layer on its surface in contact and chemically non-reactive with said electrolyte, said mobile ionic component being selectively electroplatable on and deplatable from said masking layer,
a second electrode within said container-electrode, disposed substantially on the major axis and spaced from said inner surface and from the first electrode and having an electrically conductive masking layer on its surface in contact and chemically non-reactive with said electrolyte, said mobile ionic component being selectively electroplatable on and deplatable from the masking layer on said second electrode, and
first and second discrete electrically insulative means for supporting said electrodes respectively in and sealingly closing said container-electrode.

2. The electrolytic cell set forth in claim 1 comprising the first electrode disposed within the container-electrode at a first end of the container-electrode and the second electrode disposed at a second end of the container-electrode opposite to the first end and the second electrically insulative means sealing the second electrode with the container-electrode.

3. The electrolytic cell set forth in claim 1 comprising the first and second electrodes disposed within the container-electrode at one end of the container-electrode and the second electrode disposed within the first electrode and the second electrically insulative means sealing the second electrode support with that of the first electrode.

4. An electrolytic cell in combination, comprising
an open container-electrode with a wall and having a major axis,
an electrolyte contacting a wall of said container electrode,
a first electrode disposed substantially on the major axis within an opening in said container-electrode and having a first outer surface spaced from the wall of the container-electrode and contacting the electrolyte,
a second electrode disposed substantially on the major axis and having a second outer surface spaced from the first electrode and the wall of the container-electrode and contacting the electrolyte,
at least one wall of the container-electrode and said first and second outer surfaces comprising a masking layer electrically conductive and chemically non-reactive with said electrolyte, and at least another one of the container-electrode and the first and second outer surfaces being of metal,
the electrolyte containing a mobile ionic component of said metal, said mobile ionic component being selectively electroplatable on and deplatable from said chemically non-reactive masking layer,
first electrically insulative means sealing an opening of the container-electrode and supporting said first electrode projecting therefrom into the container-electrode, and
second electrically insulative means sealing the second electrode with one of said first electrode or said container-electrode.

5. The electrolytic cell set forth in claim 4 comprising the first and second electrodes respectively extending substantially on the major axis from opposite ends of the container-electrode and the second electrically insulative means sealing the second electrode support with the container-electrode.

6. The electrolytic cell set forth in claim 4, comprising:
a third electrode disposed within the container-electrode substantially on the major axis and having a third outer surface spaced from the first and second electrodes and said wall of the container-electrode, the third outer surface of said third electrode being of material like that of the outer surface of said first and second electrodes and third electrically insulative means sealing said third electrode support with that of the second electrode.

7. An electrolytic cell in combination, comprising
an open container-electrode with a wall and having a major axis,
an electrolyte contacting a wall of said container-electrode,
a first electrode disposed substantially on the major axis within an opening in said container-electrode and having a first outer surface spaced from the wall of the container-electrode and contacting the electrolyte,
a second electrode disposed substantially on the major axis and having a second outer surface spaced from the first electrode and the wall of the container-electrode and contacting the electrolyte,
at least one wall of the container-electrode and said first and second outer surfaces being electrically conductive and chemically non-reactive with said electrolyte, and at least another one of the container-electrode and the first and second outer surfaces being of metal,
the first and second electrodes respectively extending into the container substantially on the major axis through one opening in the container,
the electrolyte containing a mobile ionic component of said metal, said mobile ionic component being selectively electroplatable on and deplatable from said chemically nonreactive masking surface,
first electrically insulative means sealing the opening of the container-electrode and supporting said first electrode projecting therefrom into the container-electrode, and
second electrically insulative means sealing the second electrode support with that of a first electrode.

8. An electrolytic cell in combination, comprising
an electrolyte containing a mobile ionic component of a metal,
three electrodes electrically insulated from each other and in contact with the electrolyte, one of said electrodes having a surface of the metal, the metal being electrochemically active with said electrolyte, another one of said electrodes having an electrically conductive masking layer in contact with and chemically non-reactive with said electrolyte, and said mobile ionic component being selectively electroplatable on and deplatable from said masking layer, one of said electrodes being a sealed container holding said electrolyte, the other two electrodes being substantially on the major axis of said container, and
first and second discrete electrically insulative means for supporting said electrode respectively in and sealingly closing said container-electrode.

9. The electrolytic cell set forth in claim 38 comprising
said other two electrodes respectively extending substantially on the major axis from opposite ends of the sealed container and means electrically insulating and sealing the other two electrodes projecting through the wall of the electrode constituting the sealed container.

10. An electrolytic cell in combination, comprising
an electrolyte containing a mobile ionic component of a metal,
three electrodes electrically insulated from each other and in contact with the electrolyte, one of said electrodes having a surface of the metal, the metal being electrochemically active with said electrolyte, another one of said electrodes having an electrically conductive masking surface in contact with and chemically non-reactive with said electrolyte, and said mobile ionic component being selectively electroplatable on and deplatable from said masking surface, one of said electrodes being a sealed container holding said electrolyte, the other two electrodes being substantially on the major axis of said container, the other two electrodes extending into the sealed container from the same end of the container and one of the other two electrodes being disposed within the other of the two electrodes, and
first and second electrically insulative means for electrically insulating and sealing the other two electrodes relative to each other and the sealed container.

11. An electrolytic cell, including,
a container-electrode having a major axis and a wall,
a first electrode disposed within said container-electrode on an axis substantially parallel to said major axis and including a first surface and a flange portion,
a second electrode disposed within said container-electrode on an axis substantially parallel to said major axis and including a second surface and a flange portion,
an electrolyte within said container-electrode in contact with said surfaces of the first and second electrodes and the wall of the container-electrode,
at least a first one of a section of the wall of the container-electrode, said first and said second surfaces having first electrically conductive means for providing electro-chemical transfer of mobile ionic components of said first electrically conductive means to said electrolyte and at least a second one of a section of the wall of the container electrode, said first and said second outer surfaces having a second electrically conductive means for preventing electro-chemical transfer of mobile ionic components of said second electrically conductive means to said electrolyte,
first insulating means in the wall of the container-electrode and against the flange portion of the first electrode for electrically insulating and hermetically sealing the first electrode within the container-electrode, and
second insulating means in the wall of the container-electrode disposed against the flange portion of the second electrode for electrically insulating and hermetically sealing the second electrode within the container-electrode.

12. The electrolytic cell set forth in claim 11, comprising
the outer member being enlarged at the end receiving the first inner electrode and the first insulating means including first and second insulating members disposed in the enlarged end of the outer electrode on opposite sides of the flange on the first inner member and the outer edge of the enlarged end of the outer electrode being crimped over against one of the first and second insulating members.

13. The electrolytic cell set forth in claim 12, comprising
the first and second inner electrodes extending into the outer electrode through the enlarged end of the outer electrode and the second inner electrode being disposed within the first inner electrode and the second insulating means including third and fourth insulating members disposed within the first inner electrode on opposite sides of the flange on the second inner electrode and the first inner electrode gripping at least one of the third and fourth insulating members.

14. The electrolytic cell set forth in claim 12, comprising
the first and second inner electrodes respectively extending from the outer electrode through the enlarged end of the outer structure and the end opposite to the enlarged end and the second insulating means including third and fourth insulating members disposed on opposite sides of the flange on the second inner electrode and the outer electrode gripping at least one of the third and fourth insulating members.

15. The electrolytic cell set forth in claim 14, comprising
the outer electrode being closed at the end opposite to the enlarged end and being recessed and the flange on the second inner electrode being disposed in the recess and the third insulating member being disposed in the recess between the closed end of the outer electrode and the flange on the second inner member and the outer electrode being crimped against the fourth insulating member and the third insulating member being hollow and the electrolyte being disposed within the hollow portion of the third insulating member.

16. In an electrolytic cell,
a first electrode having a closed end folded on itself defining a recess having an end wall, said first electrode having a major axis and a surface,
a second electrode disposed substantially on the major axis within said recess and having a flange with a surface facing the surface of the first electrode,
first insulating means disposed within the recess between the surface of the first electrode at the closed end thereof and the surface on the flange of the second electrode and having a hollow configuration,
an electrolyte in the hollow portion of the first insulating means and in contact with said surface respectively of the first and second electrodes,
one of said first and second surfaces being electrically conductive and chemically non-reactive with said electrolyte and the other of said first and second surfaces being a metal,
said electrolyte containing a mobile ionic component of said metal, the mobile ionic component being selectively electroplatable on and deplatable from said chemically non-reactive surface, and second insulating means disposed against the opposite surface of said flange.

17. In the electrolytic cell set forth in claim 16, the first electrode being crimped at the folded portion to seal the second insulating means against the first and second electrodes.

18. An electrolytic cell in combination, comprising
a container-electrode with an opening and an inner surface,
an electrolyte in said container-electrode,
a first electrode disposed within the opening in the container-electrode and having a first outer surface spaced from the walls of the container-electrode and having a hollow configuration,
a second electrode disposed within the opening in the container-electrode and within the hollow configuration of the first electrode and having a second outer surface spaced from the walls of the container-electrode and from the first electrode,
at least one of said wall of the container-electrode, said first and said second outer surfaces being electrically conductive and chemically non-reactive with the electrolyte, and at least another one of said wall of the container-electrode, said first and said second outer surfaces being a metal,
said electrolyte containing a mobile ionic component of said metal, said mobile ionic component being selectively electroplatable on and deplatable from said chemically non-reactive surface,
first insulating means sealing the opening of the container-electrode and supporting said first electrode projecting therefrom into the container-electrode, and
second electrically insulative means sealing the second electrode in the first electrode.

19. The electrolytic cell set forth in claim 18, comprising
the first electrode having a flange and the first insulating means comprising first and second insulating members disposed between the container-electrode and the first electrode and sandwiching the first flange and the container-electrode gripping at least one of the first and second insulating members against the first electrode and the second electrode having a flange and the second insulating means comprising third and fourth insulating members disposed between the first and second electrodes and sandwiching the second flange and the first electrode gripping at least one of the third and fourth insulating members against the second electrode.

20. The electrolytic cell set forth in claim 19, comprising
the third and fourth insulating members being disposed near one end of the first and second electrodes and the second insulating means including a fifth insulating member disposed between the first and second electrodes near the opposite end of the first and second electrodes and the first electrode gripping the fifth insulating member against the second electrode and the edge of the container-electrode at the opening in the container-electrode being rolled over and crimped against the first insulating member.

References Cited

UNITED STATES PATENTS

| | | | |
|---|---|---|---|
| 858,574 | 7/1907 | Churcher | 317—233 |
| 2,154,026 | 4/1939 | Brennan | 317—230 |
| 2,736,846 | 2/1956 | Gables | 317—230 |
| 2,739,275 | 3/1956 | Houtz et al. | 317—230 |
| 2,791,473 | 5/1957 | Mattox | 317—231 X |
| 3,017,612 | 1/1962 | Singer | 317—231 |
| 3,119,754 | 1/1964 | Blumenfeld et al. | 324—68 |
| 3,125,673 | 3/1964 | Puterbaugh | 235—92 |
| 3,158,798 | 11/1964 | Sauder | 317—231 X |
| 3,172,083 | 3/1965 | Constatine | 340—173 |
| 3,210,662 | 10/1965 | Steinmetz et al. | 324—94 |
| 3,346,783 | 10/1967 | Millard | 317—230 |

FOREIGN PATENTS 1,921,265  8/1965  Germany.

JAMES D. KALLAM, *Primary Examiner.*

U.S. Cl. X.R.

324—94; 340—173